April 18, 1933. J. J. STOETZEL 1,904,098
PNEUMATIC DISPATCH SYSTEM VALVE
Filed Dec. 31, 1929
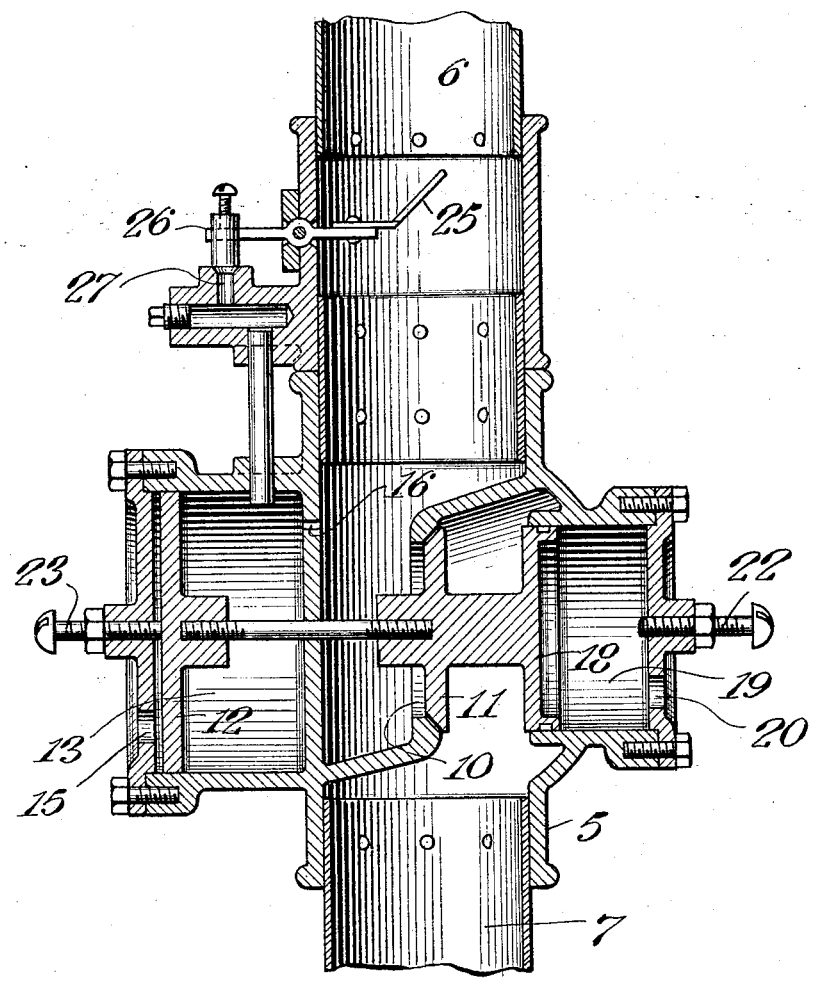
INVENTOR
Joseph J. Stoetzel
BY Merrell E. Clark
ATTORNEY Patented Apr. 18, 1933

1,904,098

UNITED STATES PATENT OFFICE

JOSEPH JOHN STOETZEL, OF QUEENS VILLAGE, NEW YORK, ASSIGNOR TO G & G ATLAS SYSTEMS, INC., OF NEW YORK, N. Y., A CORPORATION OF NEW YORK

PNEUMATIC DISPATCH SYSTEM VALVE

Application filed December 31, 1929. Serial No. 417,629.

The present invention relates to pneumatic dispatch tube systems and has for an object to provide an improved air controlling and regulating device for a system of the minimum flow type.

It is desirable so to control the air flowing in the pneumatic tube line that when there is no carrier in the line a minimum flow of air will be maintained and when the line is loaded with one or more carriers an operative air current will be induced.

The present invention provides an improved arrangement comprising a valve which will be maintained in substantially closed condition when the line is entirely open but will automatically open when the line is obstructed by a carrier inserted therein, the arrangement being such that the valve is opened by movement in the direction of flow of the air.

The nature and objects of the invention will be better understood from a description of a particular embodiment of the invention for the purpose of which description reference should be had to the accompanying drawing forming a part hereof and in which—

The figure is a central sectional view of a control mechanism embodying the invention.

The structure shown for the purposes of illustrating the invention comprises a control valve for a minimum flow pneumatic dispatch system designed, when the valve is substantially closed, to permit a minimum flow of air and, when the valve is open, to permit a carrier driving flow. As usual in control mechanisms of this type the arrangement is such that when a carrier is inserted in the line, the reduction of pressure in the line due to the suction will cause an opening of the control valve to cause a carrier driving flow of air and when the last carrier in the line is delivered and the line is free the valve will be again automatically closed.

Referring particularly to the structure shown in the drawing, the valve casing 5 arranged to be connected to a dispatch tube line 6 and a suction line 7 as is usual in control valves of this type, has a central port 10 closed by a valve member 11 which moves in the direction of the flow of air to open the port and in opposition to the flow of air to close it. The valve member is shown as freely floating in the casing as distinguished from a valve member which is spring pressed in either direction. A pneumatic subject to variation of pressure within the dispatch line is operatively connected to move the valve member to open position when the pressure within the dispatch line is reduced as occurs upon insertion of a carrier within the line. As shown the pneumatic comprises a piston 12 operating in a cylinder 13 and directly connected to the valve member 11.

The piston 12 is subject on its outer face to atmospheric pressure through the port 15 and is subject on its inner face to the pressure of air in the suction line through the restricted port 16. Accordingly when the pressure of air in the suction line is reduced by virtue of the insertion of a carrier in the line, the valve member 11 will be moved to open position to permit a carrier driving flow of air. The port 16 is of relatively small diameter in order that the piston 12 operating in the cylinder may have something of a dash pot action to dampen the movement of the valve member. A second pneumatic subject on opposite sides to the pressure of atmospheric air and the pressure of air within the suction line acts in opposition to the first mentioned pneumatic tending to move the valve member to closed position. This pneumatic is shown in the form of a piston 18 operating in a cylinder 19 and subject on its outer face to atmospheric air through the port 20, and subject on its inner face to the pressure within the suction line.

In the particular structure shown the valve disk and the two pistons or heads are rigidly connected in one unitary structure, movement in opposite directions being limited by the adjustable stop screws 22 and 23. Preferably the arrangement is such that the valve member is movable in opposition to the flow of air to close the port. The diameters of the valve disk and of the two pistons may be so selected as to provide the required action in operation. If no spring is used, as in the structure illustrated, the piston 18 may be slightly larger than the valve disk 11 and the piston 12 may be enough larger than the valve disk 11 to cause the opening movement when the pressure in the dispatch line is reduced a predetermined amount. In the valve illustrated, the disk has an effective diameter of 2.1", the piston 18 a diameter of 2.15" and the piston 12 a diameter of 3".

It is desirable to provide means for causing an immediate closing of the valve when the last carrier is discharged from the dispatch line. To this end a vane 25 is provided in position to be actuated by the rapid flow of air which occurs when the last carrier is discharged from the line. This vane is operatively connected to a valve member 26 which closes a port 27 between the cylinder 13 and the atmosphere. Ordinarily this valve member is maintained in port closing position but upon the occurrence of a rapid flow of air in the suction line, it will be opened to cause the closing of the valve.

It will be noted that the piston 12 acting as a valve controlling pneumatic is connected directly to the valve member as distinguished from the type of arrangement in which the pneumatic operates a valve to admit air to a second pneumatic which in turn actuates the valve member.

The foregoing particular description is illustrative merely and is not intended as defining the limits of the invention.

I claim:

1. A control valve for a minimum flow pneumatic dispatch system comprising a valve casing having a main port, a valve member closing said port and movable in opposition to the flow of air to close said port and pneumatic means subject to pressure within the line and connected to said valve member to actuate it in either direction, said pneumatic means communicating with the line through a restricted opening.

2. A control valve for a minimum flow pneumatic dispatch system comprising a valve casing having an inlet for connection to the dispatch line and an outlet for connection to a suction line with a port between the inlet and outlet, and a valve member controlling said port and movable in opposition to the flow of air to close said port, said valve member comprising a valve disk and two pistons, the valve disk closing said port, one piston of greater area than the valve disk subject on one face to the suction line pressure and on the other face to atmospheric pressure serving to move the valve member to closed position and the other piston of still greater area subject on one side to the pressure of the suction line and on the other side to atmospheric pressure tending to move the valve member to open position.

3. A control valve for a minimum flow pneumatic dispatch system comprising a valve casing having an inlet for connection to the dispatch line and an outlet for connection to a suction line with a port between the inlet and outlet, a valve member controlling the port and opening in the direction of flow through the port, said valve member having two heads of different sizes each subject to atmospheric pressure on one side and to the pressure within the system on the other side and acting in opposition to each other, the larger tending to open the valve and the smaller serving to close the valve.

4. A control valve for a minimum flow pneumatic dispatch system comprising a valve casing having an inlet for connection to the dispatch line and an outlet for connection to a suction line with a port between the inlet and outlet, a valve member movable in opposition to the flow of air to close said port, a cylinder having a restricted port opening to the dispatch line, a piston in said cylinder operatively connected to said valve and on one side subject to atmospheric pressure and on the other side subject through said restricted port to the pressure of the dispatch line, said piston acting to move said valve member to open position when the presure in the dispatch line is reduced, and pneumatic means acting in opposition to said piston and serving to move said valve member to closed position.

In testimony whereof, I have signed my name to this specification this 16th day of December, 1929.

JOSEPH JOHN STOETZEL.